US007503722B2

(12) United States Patent
Chou

(10) Patent No.: US 7,503,722 B2
(45) Date of Patent: Mar. 17, 2009

(54) POSITIONING DEVICE FOR CLIPPING APPARATUS

(75) Inventor: Chin-Wen Chou, Taipei Hsien (TW)

(73) Assignee: Zippy Technology Corp., Taipei Hsien (TW)

( * ) Notice: Subject to any disclaimer, the term of this patent is extended or adjusted under 35 U.S.C. 154(b) by 144 days.

(21) Appl. No.: 11/472,476

(22) Filed: Jun. 22, 2006

(65) Prior Publication Data

US 2007/0294893 A1 Dec. 27, 2007

(51) Int. Cl.
*F16B 21/06* (2006.01)

(52) U.S. Cl. .................... 403/325; 403/322.1; 403/327; 292/333; 292/DIG. 4; 292/DIG. 37

(58) Field of Classification Search ................. 403/321, 403/322.1, 325, 326, 327; 292/332, 333, 292/336, DIG. 4, DIG. 37
See application file for complete search history.

(56) References Cited

U.S. PATENT DOCUMENTS 2,637,576 A * 5/1953 Nottingham ................ 312/333
5,775,748 A * 7/1998 Kurachi ................. 292/DIG. 4
5,984,381 A * 11/1999 Yamagishi ............. 292/DIG. 4
6,332,732 B1 * 12/2001 Mantovani ............... 403/322.1
7,278,664 B2 * 10/2007 Su et al. ................ 292/DIG. 4

FOREIGN PATENT DOCUMENTS

TW M285631 U 1/2006

* cited by examiner

*Primary Examiner*—Daniel P Stodola
*Assistant Examiner*—Michael P Ferguson
(74) *Attorney, Agent, or Firm*—Muncy, Geissler, Olds & Lowe, PLLC

(57) ABSTRACT

A positioning device for clipping apparatus includes a hollow body which has an open side on one side that holds a track portion and an anchor portion on another side. The body houses a sliding member having a clipping unit and a harness arm. The harness arm is connected to the track portion to form a displacement path of the sliding member. The clipping unit includes an upper clipping portion and a lower clipping portion. The upper clipping portion is driven by the sliding member to move close to the lower clipping portion. A linking means connects an elastic element to the anchor portion and the sliding member so that the elastic element can be stretched and retracted against the displacement path of the sliding member to provide a returning elastic force to the sliding member. Thereby the sliding member can be positioned rapidly on each displacement path.

4 Claims, 10 Drawing Sheets

POSITIONING DEVICE FOR CLIPPING APPARATUS

FIELD OF THE INVENTION

The present invention relates to a push clipping apparatus and particularly to a design to perform positioning through a tracking portion and an elastic element in a push clipping apparatus.

BACKGROUND OF THE INVENTION

A clipping apparatus basically aims to couple two elements together or release one of the two elements through a simple operation. It generally is adopted on doors or the like. For instance, the door of the operation panel of household appliances usually uses such an apparatus. The conventional clipping apparatus have many types and are operated in different ways. The commonly adopted operation is depressing. A first depressing aims to clip, and a second depressing aims to release. A desirable clipping apparatus has to be simple to use, clip firmly and not getting loose easily. The movement of the sliding member on every displacement path has to be accurate and crisp. To release the clipping article rapidly also is important. The design of the internal structure of the clipping apparatus directly affects those characteristics.

R.O.C. patent publication No. M285631 entitled “Sideward clipping apparatus” discloses a clipping apparatus which has a seat containing a housing trough. The housing trough holds an elastic element and a guiding member. The housing trough also contains a sliding member directed by the elastic element and the guiding member at a first position in normal conditions and at a second position when depressed. The sliding member has a movable linking element and a clipping pawl which has an upper clipping end and a lower clipping end. The lower clipping end at the initial force receiving stage drives the upper clipping end through the movable linking element to form a first fan-shape moving track. The lower clipping end is in contact with the sliding member under the force and moves vertically downwards to the second position to drive the upper clipping end to form a second fan-shape moving track. The upper and lower clipping ends form a clipping zone when the sliding member is moved to the second position to clip an article.

When the sliding member is moved from the second position to the first position, the article is released. Due to the upper and lower clipping ends are linked by a flexible linking blade, when the article is released the flexible linking blade does not have enough return force. As a result, the upper and lower clipping ends cannot open rapidly to release the article. While it can securely clip the article, it cannot release the article quickly and crisply. It causes problems when in use. Moreover, the guiding member and elastic element are located on the same side of the housing trough. When the lower clipping end is depressed under force the distal end of the guiding member easily skews due to the action force. As a result, the sliding member cannot be moved to the intended position and the clipping apparatus cannot function as desired. This also causes a lot of troubles.

SUMMARY OF THE INVENTION

The primary object of the present invention is to provide a positioning device for clipping apparatus to allow a harness arm to be moved steadily on a track portion without straying away from a selected track while a sliding member is moved in a body so that the sliding member can be positioned rapidly and accurately on each displacement track through an elastic element.

To achieve the foregoing object, according to an embodiment of the invention a hollow body is provided. The body has an open side on one side and a track portion on the open side, and an anchor portion on another side thereof. The body further holds a sliding member which has a clipping unit and a harness arm. The harness arm is coupled with the track portion to form a displacement path of the sliding member. The clipping unit has an upper clipping portion and a lower clipping portion. The upper clipping portion can be driven by the sliding member to move close to the lower clipping portion. Through a linking means an elastic element can be connected to the anchor portion and the sliding member to perform stretching and retracting movements against the displacement path of the sliding member.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
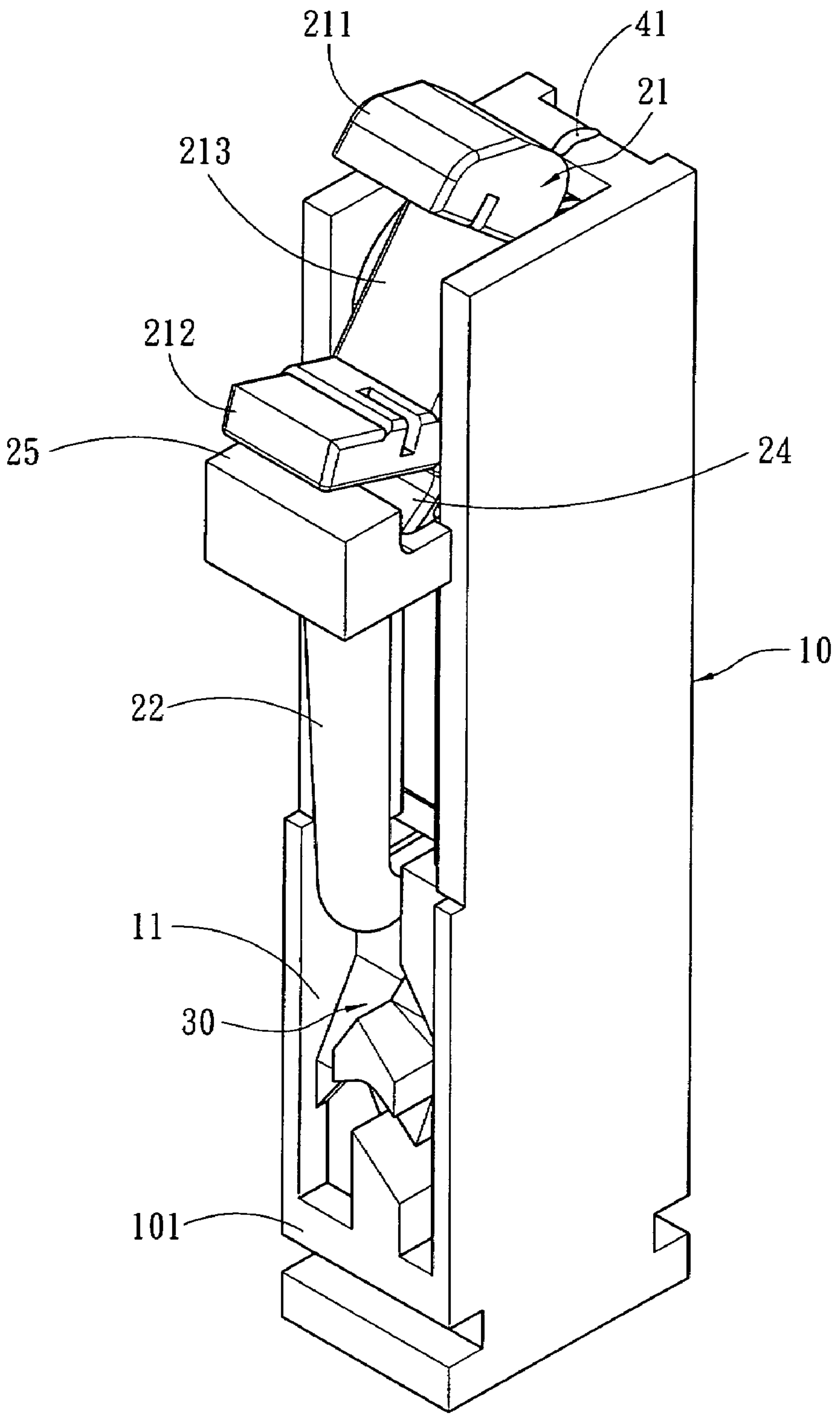
FIG. 1 is a perspective view of an embodiment of the invention.
Figure 2:
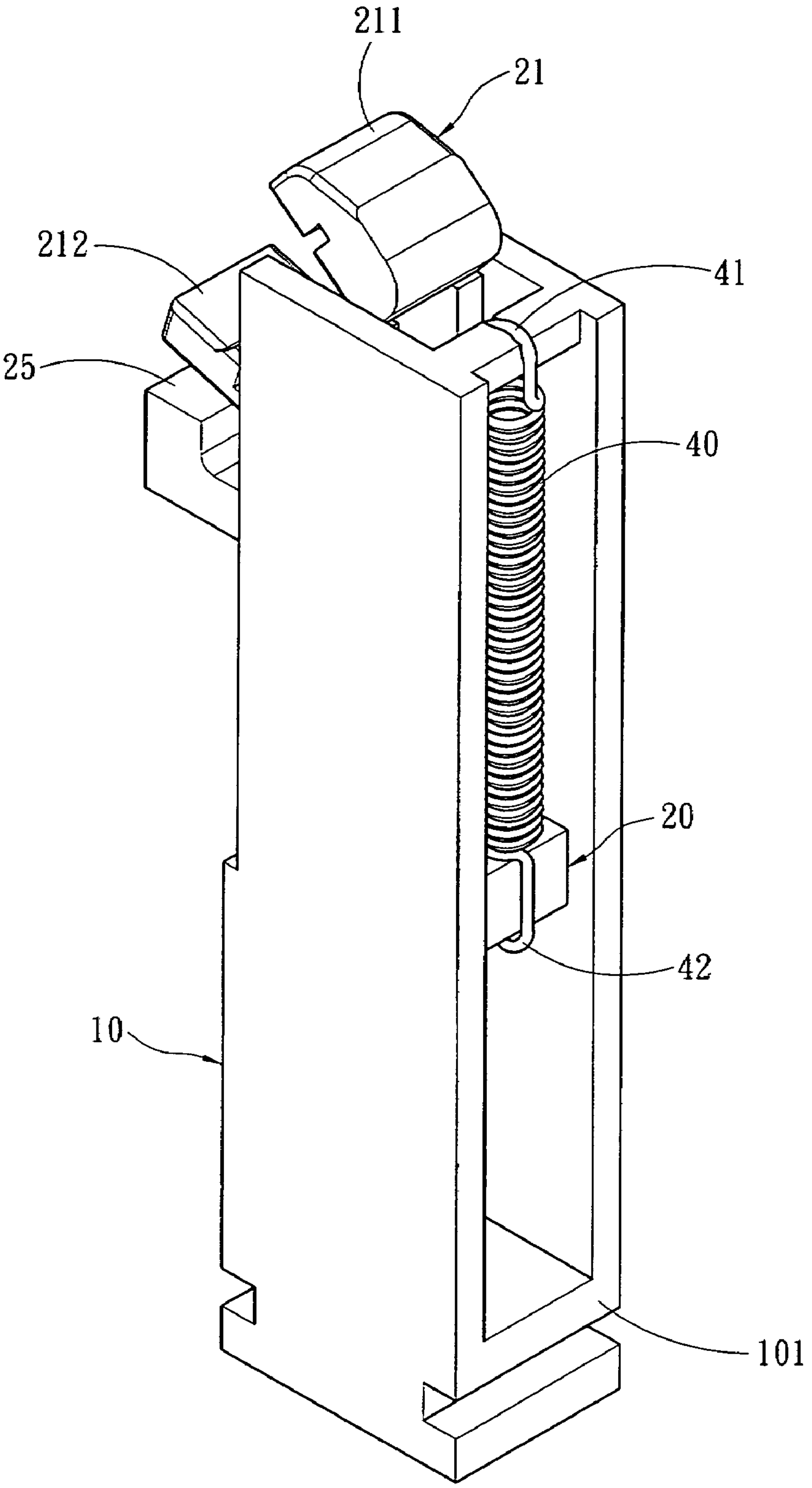
FIG. 2 is another perspective view of an embodiment of the invention.
Figure 3:
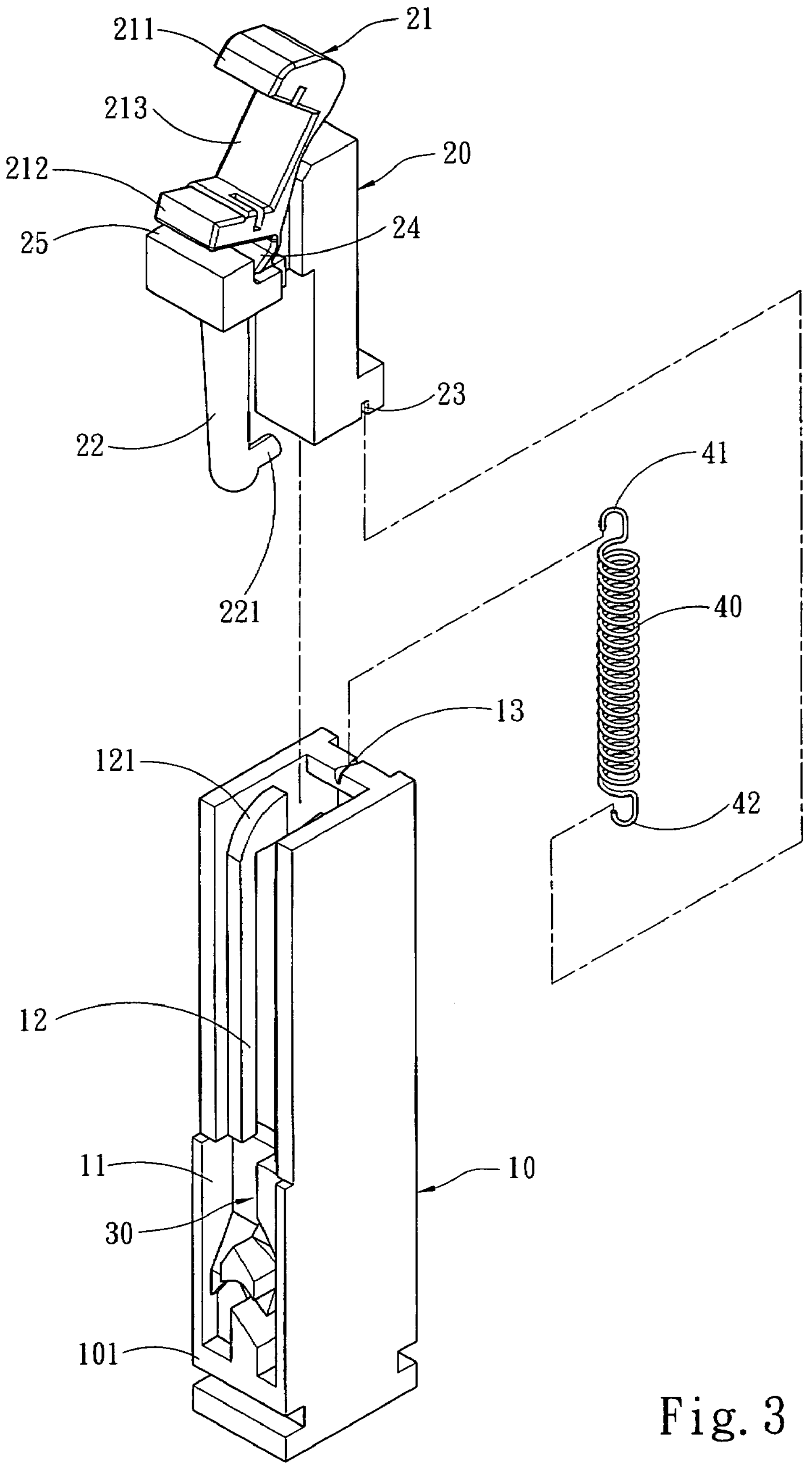
FIG. 3 is an exploded view of an embodiment of the invention.

Please refer to FIG. 1 for an embodiment of the invention. The invention includes a hollow body 10 which has an open side 11 on one side which has a track portion 30. The body 11 houses a sliding member 20 (as shown in FIG. 3). The body 10 further has a guiding portion 12 on an inner wall to confine the sliding member 20 from escaping the body 10. The sliding member 20 has a clipping unit 21 and a harness arm 22. The track portion 30 has a selected height. The harness arm 22 has a harness end 221 corresponding to the height of the track portion 30 to be confined in the track portion 30 to form a displacement path of the sliding member 20. The clipping unit 21 includes an upper clipping portion 211 and a lower clipping portion 212. The lower clipping portion 212 is connected to the sliding member 20 in an integrated manner through a movable linking member 24. The lower clipping portion 212 is connected to the upper clipping portion 211 through a flexible linking blade 213. The body 10 has an anchor portion 13 on another side (as shown in FIGS. 2 and 3). The anchor portion 13 is coupled with an elastic element 40 which may be a spring with two ends forming a first hook 41 and a second hook 42. The first hook 41 is fastened to the anchor portion 13. The sliding member 20 has an anchor trough 23 on a lower edge to be coupled with the second hook 42 so that the elastic element 40 can be stretched and retracted against the displacement path of the sliding member 20 to move and position the sliding member 20 rapidly.

Figure 4A:
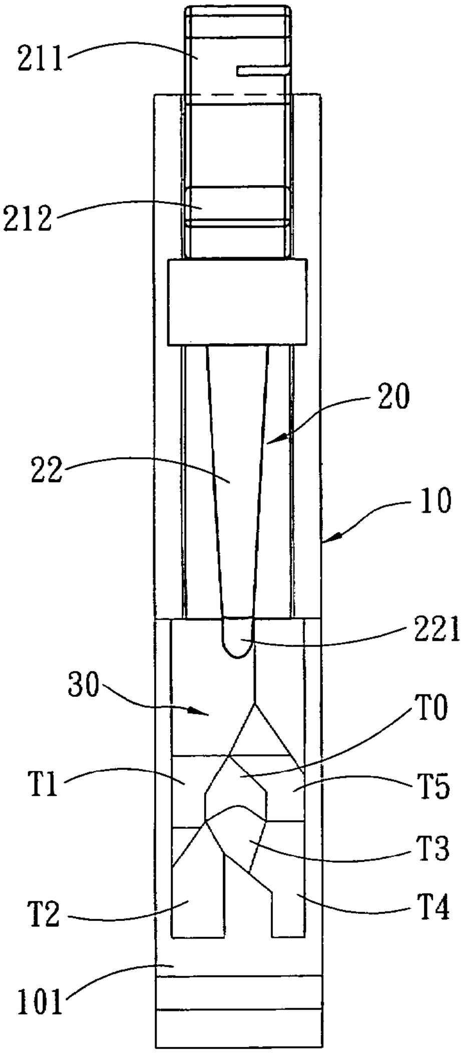
FIGS. 4A through 4F are schematic views of an embodiment of the invention in operating conditions.
Figure 4B:
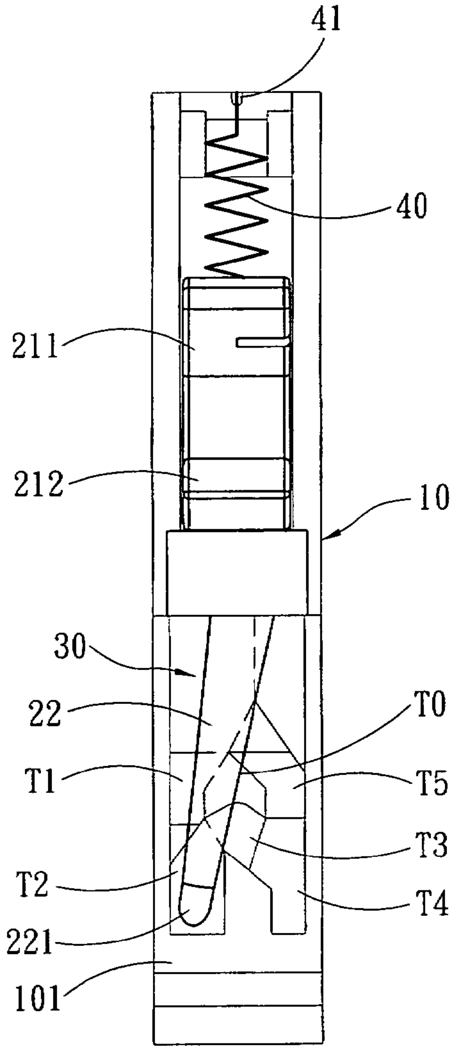
Figure 4C:
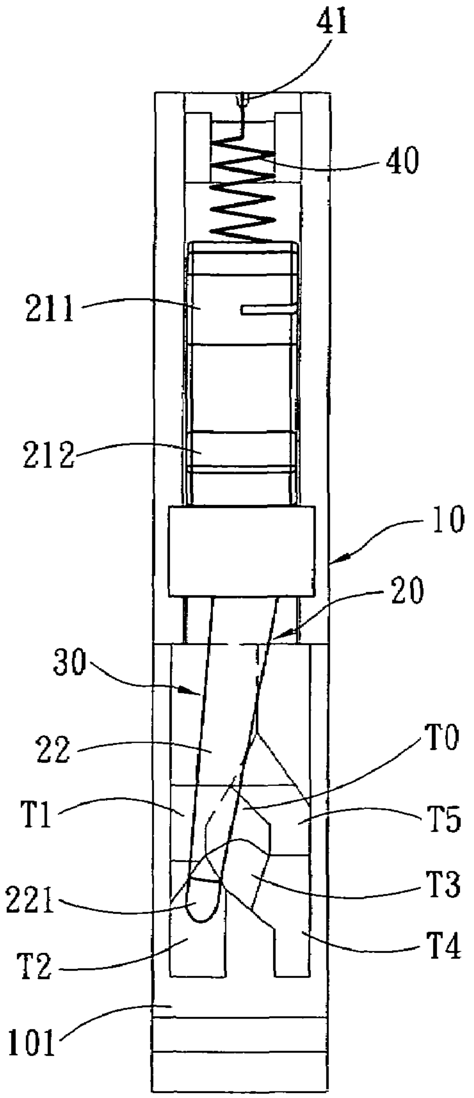
Figure 4D:
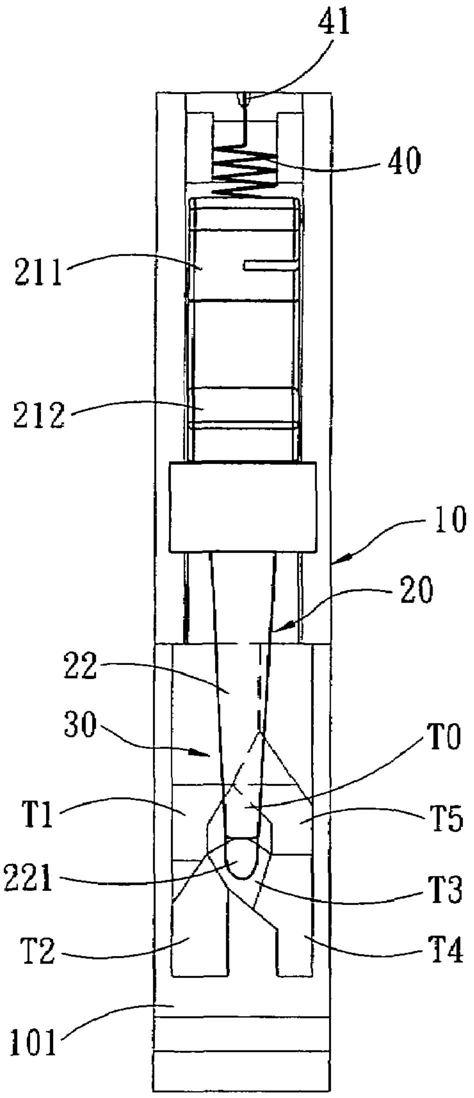
Figure 4E:
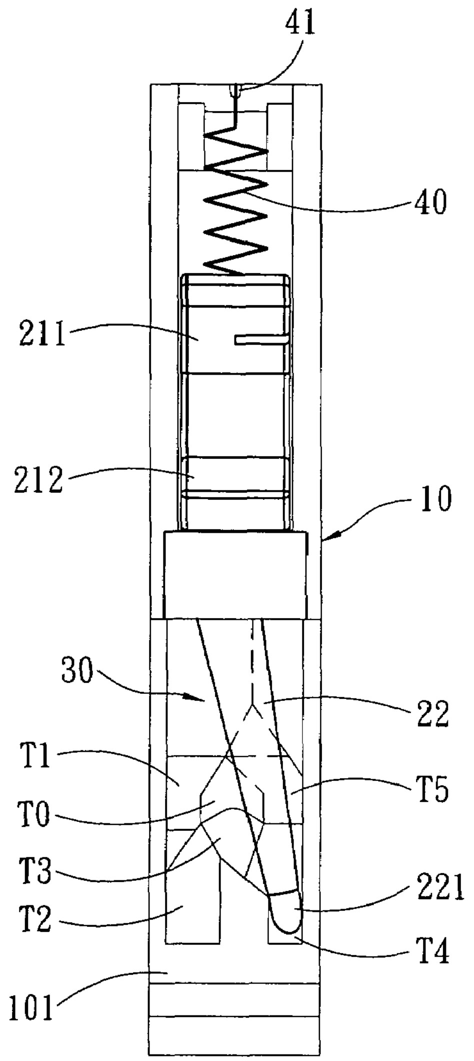
Figure 4F:
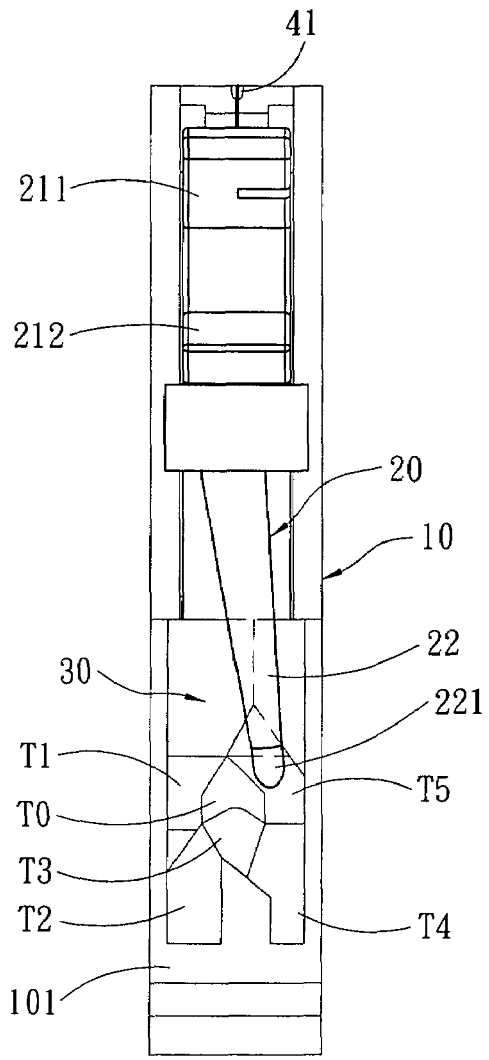

Refer to FIGS. 4A through 4F for the embodiment of the invention in operating conditions. The harness end 221 of the harness arm 22 forms the displacement path of the sliding member 20 according the geometric shape of the track portion 30. The displacement path includes in this order: a starting position, a first stage depressing position, a depressed position, and a second stage depressing position. When the lower clipping portion 212 receives a force and is depressed to drive the sliding member 20 to move in the body 10, the sliding member 20 slides from the starting position (referring to FIGS. 4A and 5A) towards a closed end 101 of the body 10, and the elastic element 40 stores an elastic force, while the harness end 221 of the harness arm 22 is guided by a first directing surface T1 of the track portion 30 and moved to a second directing surface T2; at that moment the sliding member 20 is located on the first stage depressing position (as shown in FIG. 4B). When the force on the lower clipping portion 212 is released, through pulling of the elastic element 40 the harness end 221 is moved from the second directing surface T2 to a third directing surface T3 (referring to FIG. 4C) and anchored on a recess of a bulged portion T0; at that moment the sliding member 20 is located on the depressed position (referring to FIGS. 4D and 5C); meanwhile the upper and lower clipping portions 211 and 212 form a clipping condition. When there is a desire to release a clipping article 50, depress again the lower clipping portion 212, the harness end 221 is moved from the third directing surface T3 to a fourth directing surface T4; at that moment the sliding member 20 is located on the second stage depressing position (referring to FIG. 4E). When the force is released, through pulling of the elastic element 40 the harness end 221 is moved from the fourth directing surface T4 to a fifth directing surface T5 (referring to FIG. 4F). Finally the sliding member 20 returns to the starting position.

Figure 5A:
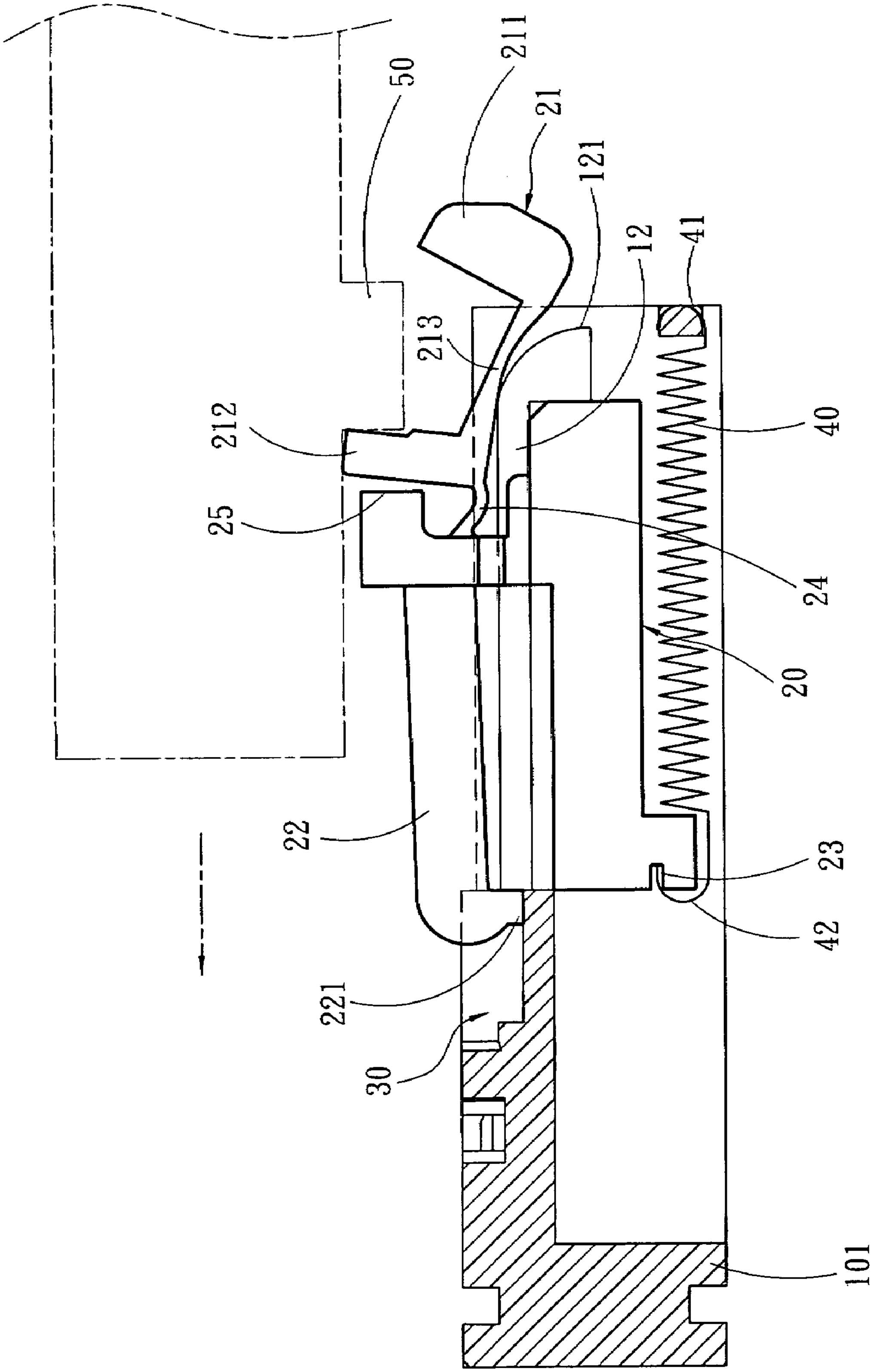
FIGS. 5A through 5C are schematic views of an embodiment of the invention in other operating conditions.
Figure 5B:
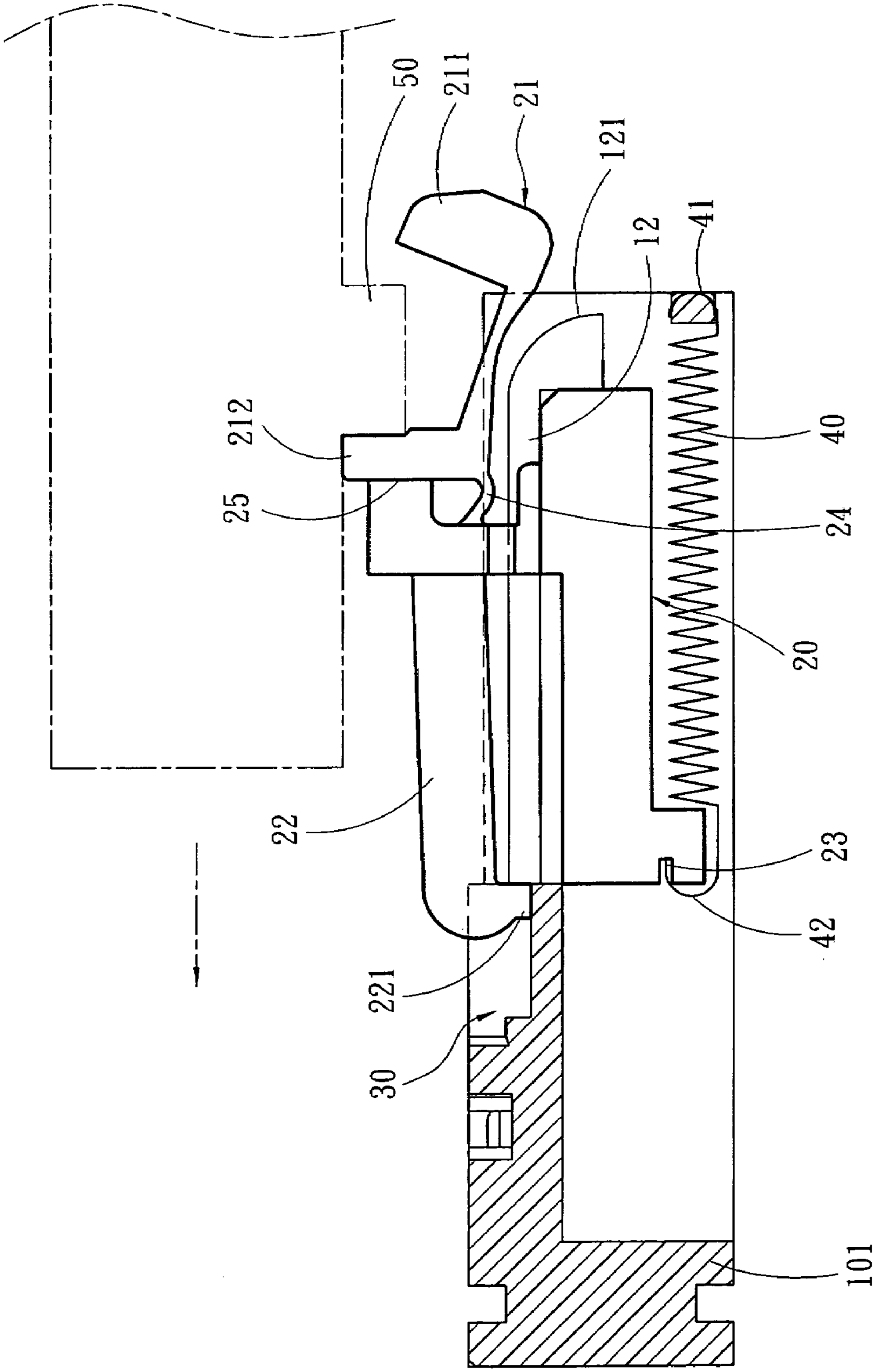
Figure 5C:
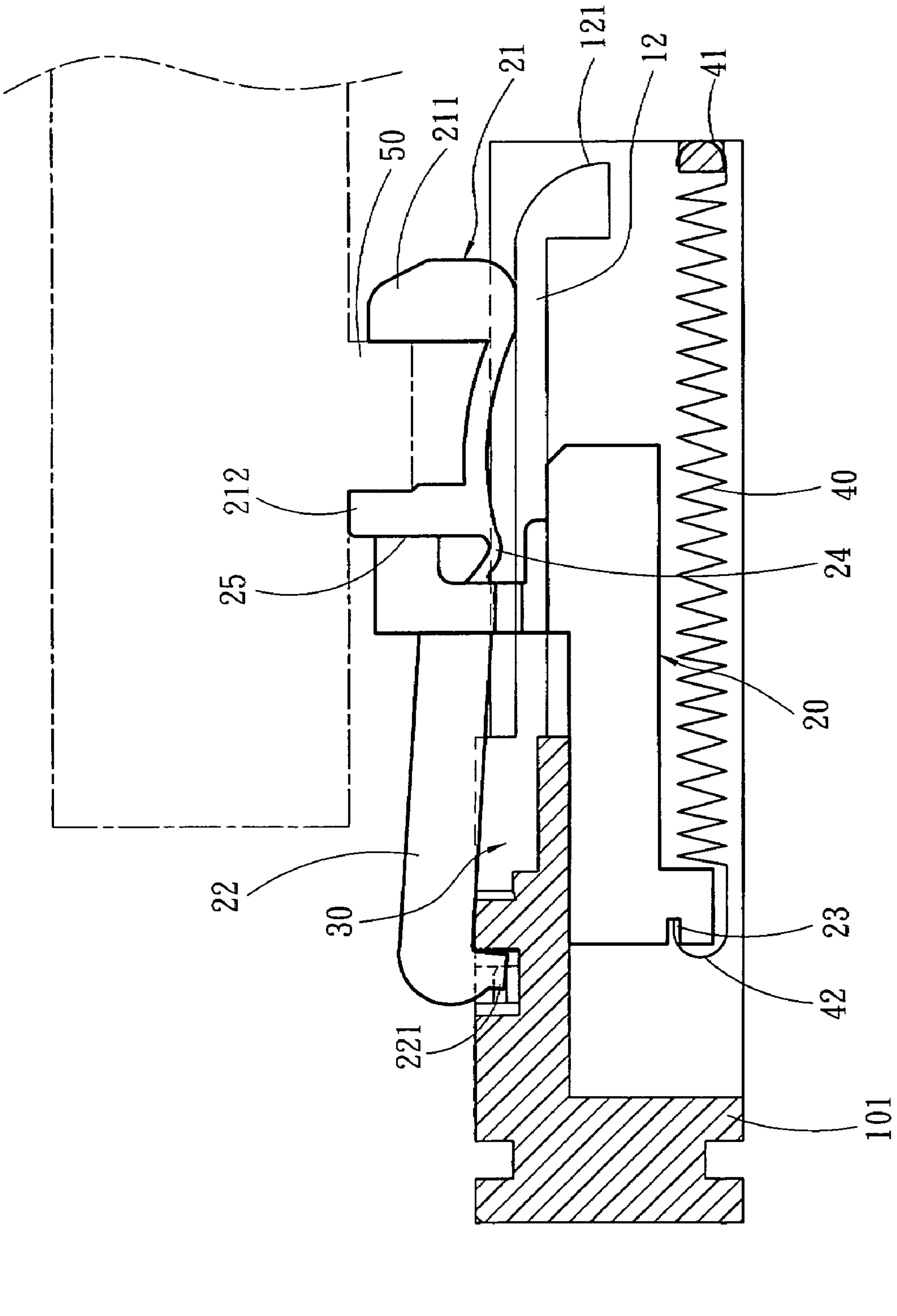
Figure 6:
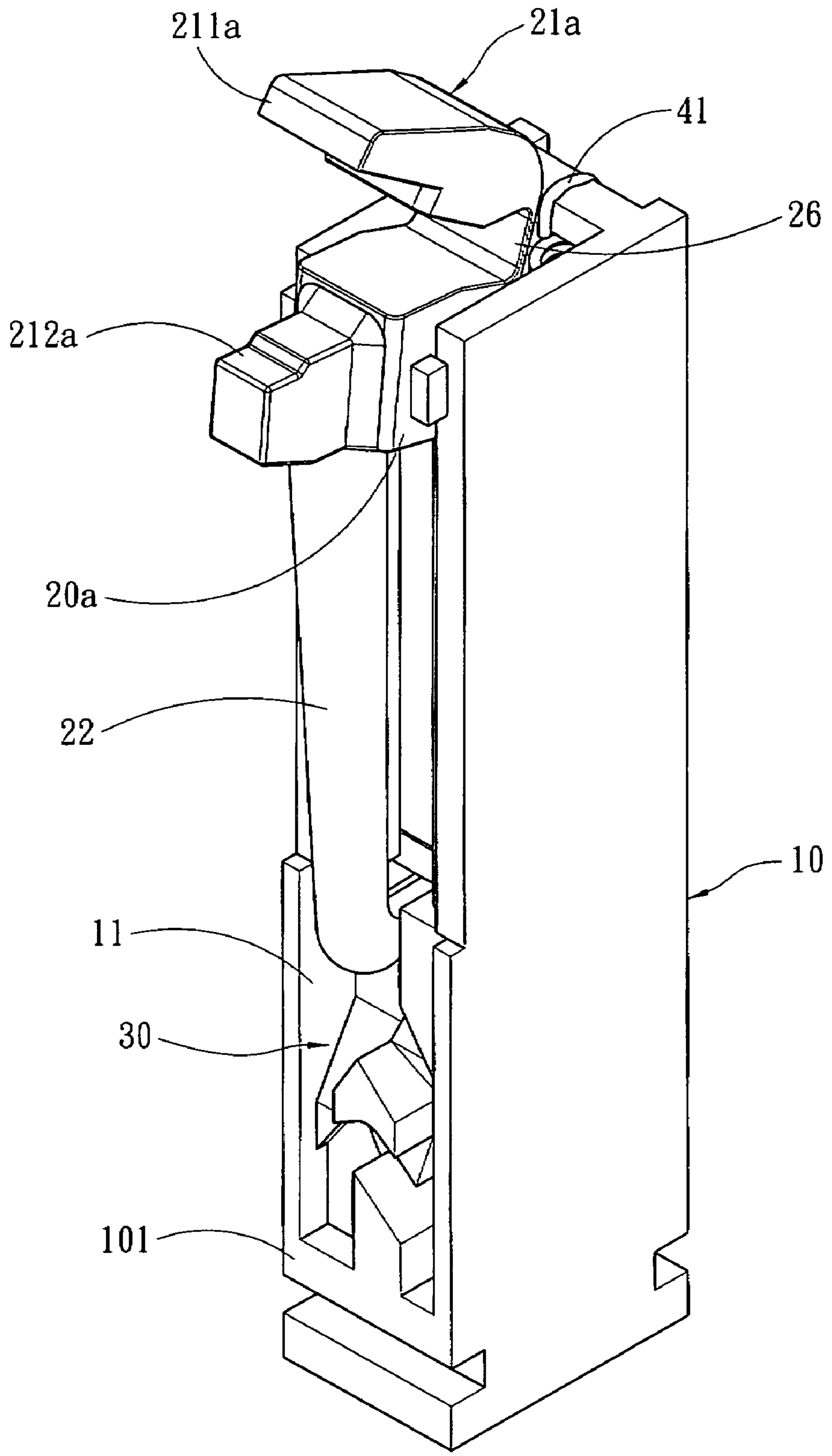
FIG. 6 is a perspective view of another embodiment of the invention

Refer to FIGS. 5A through 5C for another operating condition of the embodiment of the invention. At the starting position, the lower clipping portion 212 is urged by a clipping article 50 to drive the upper clipping portion 211 about the movable linking member 24 through the pulling force of the elastic element 40 so that the upper clipping portion 211 and the lower clipping portion 212 are moved synchronously to form a first fan-type moving track (referring to FIGS. 5A and 5B). The lower clipping portion 212 continuously receives the force and moves to a vertical moving track of the first stage depression, and drives the upper clipping portion 211 to form a second fan-type moving track (referring to FIGS. 5B and 5C). The upper and lower clipping portions 211 and 212 form a clipping condition while the sliding member 20 is at the depressed position to clip the clipping article 50, and the elastic element 40 is pulled by the sliding member 20 to store a potential energy (referring to FIG. 5C). To aid forming of the second fan-type moving track, the guiding portion 12 has an arched portion 121. When the lower clipping portion 212 is in the condition of receiving the force, the movable linking member 24 slides over the surface of the arched portion 121 to allow the upper clipping portion 211 to form the second fan-type moving track. In order to enable the lower clipping portion 212 to be positioned accurately or to match the profile of the clipping article 50, a displacement space is formed between the sliding member 20 and the lower clipping portion 212, and a bucking surface 25 also is formed. Hence before the lower clipping portion 212 is depressed to form the first fan-type moving track and moved to the second moving track, it can be positioned accurately on the surface of the clipping article 50 through the bucking surface 25. Moreover, depress the lower clipping portion 212 one more time, the elastic element 40 provides a returning pulling force to move the sliding member 20 to its original position to release the clipping article 50 (referring to FIG. 5A). The invention can be adapted to a wide variety of clipping apparatus. Referring to FIG. 6, the lower clipping portion 212*a* is extended on side of the sliding member 20*a*. The sliding member 20*a* has another side connecting to the upper clipping portion 211*a* through a linking blade 26. When the lower clipping portion 212*a* receives a force and moved, it drives the upper clipping portion 211*a* to form a clipping zone close to the lower clipping portion 212*a*. Hence even if the construction of the clipping unit 21*a* is different, the structure of the invention is still adoptable.

In short, the invention has the elastic element 40 and the track portion 30 locating on two sides of the body 10. When the elastic element 40 moves and positions the sliding member 20 or 20*a*, the harness end 221 is moved on the track portion 30 towards to the wall surface of the track portion 30. Thus when the sliding member 20 or 20*a* is moved in the body 10, the harness arm 22 can be moved steadily on the track portion 30 without straying outside the selected track. Moreover, while the sliding member 20 or 20*a* is moved on each displacement track, it can be positioned rapidly and accurately through the elastic element 40.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A positioning device for a clipping apparatus, comprising:

a hollow body which has an open side on one side to form an elongated track portion defining first and second clipping positions and including first and second directing surfaces attached to said hollow body longitudinally between said first and second clipping positions, the second directing surface transversely projecting above the first directing surface to define respective fist and second depressing positions, and an anchor portion on another side;

a sliding member which is located in the body and includes a clipping unit and a harness arm, the harness arm being connected to the track portion to form a displacement path of the sliding member, said harness arm moving transversely along said directing surfaces between the first and second depressing positions, the second depressing position retaining the harness arm in the second clipping position, and longitudinally sliding between the first and second clipping positions, the clipping unit including a lower clipping portion and an upper clipping portion driven by the sliding member to move close to the lower clipping portion to clip onto a clipping article when in the second clipping position and to move away from the lower clipping portion to release the article when in the first clipping position; and an elastic element connected to the anchor portion and the sliding member through a linking means to generate stretching and retracting movements against the displacement path of the sliding member, the linking means including a first hook and a second hook on two ends of the elastic element, the first hook being fastened to the anchor portion, the sliding member having an anchor trough on a lower edge thereof coupled with the second hook, wherein said elastic element generates a pulling force on said sliding member to bias the sliding member towards the first clipping position.

2. The positioning device for clipping apparatus of claim 1, wherein the body has a guiding portion on an inner wall to confine the sliding member from escaping the body.

3. The positioning device for clipping apparatus of claim 1, wherein the track portion has a selected height, the harness arm having a harness end corresponding to the height of the track portion to be confined in the track portion.

4. The positioning device for clipping apparatus of claim 1, wherein the elastic element is a spring.

* * * * *